(12) United States Patent
Jeon et al.

(10) Patent No.: US 8,223,357 B2
(45) Date of Patent: Jul. 17, 2012

(54) METHOD AND SYSTEM FOR PRINTING IMAGE USING TEMPLATE AND RECORDING MEDIUM STORING THE METHOD

(75) Inventors: Yu-seong Jeon, Suwon-si (KR); Du-il Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1276 days.

(21) Appl. No.: 11/274,196

(22) Filed: Nov. 16, 2005

(65) Prior Publication Data

US 2006/0119885 A1   Jun. 8, 2006

Related U.S. Application Data

(60) Provisional application No. 60/633,421, filed on Dec. 7, 2004.

(30) Foreign Application Priority Data

Feb. 5, 2005   (KR) .................. 10-2005-0011013

(51) Int. Cl.
  *G06F 3/12* (2006.01)
  *G06K 15/00* (2006.01)
(52) U.S. Cl. ..................................... 358/1.15; 358/1.18
(58) Field of Classification Search .................. None
  See application file for complete search history.

(56) References Cited

U.S. PATENT DOCUMENTS

| | | | |
|---|---|---|---|
| 6,327,049 B1* | 12/2001 | Ohtsuka | 358/1.18 |
| 7,151,617 B2* | 12/2006 | Fukushima et al. | 358/1.16 |
| 7,463,382 B2* | 12/2008 | Saeki | 358/1.15 |
| 7,675,647 B2* | 3/2010 | Tsue et al. | 358/1.9 |
| 2003/0061569 A1* | 3/2003 | Aoki | 715/517 |
| 2004/0046990 A1* | 3/2004 | Yano et al. | 358/1.15 |
| 2004/0052410 A1* | 3/2004 | Yasukawa et al. | 382/141 |
| 2004/0075866 A1* | 4/2004 | Thormodsen et al. | 358/1.18 |
| 2005/0018249 A1* | 1/2005 | Miura et al. | 358/1.15 |
| 2005/0065857 A1* | 3/2005 | Sakai et al. | 705/26 |
| 2005/0141849 A1* | 6/2005 | Tsue et al. | 386/4 |
| 2005/0149565 A1* | 7/2005 | Oak et al. | 707/104.1 |
| 2005/0259292 A1* | 11/2005 | Tokimoto et al. | 358/1.15 |

FOREIGN PATENT DOCUMENTS

| | | | |
|---|---|---|---|
| JP | 2000-112698 A | | 4/2000 |
| JP | 2001001581 A | * | 1/2001 |
| JP | 2001-130078 A | | 5/2001 |
| JP | 2002-27367 A | | 1/2002 |
| JP | 2002-140254 A | | 5/2002 |
| JP | 2003-167692 A | | 6/2003 |
| JP | 2003-223304 A | | 8/2003 |
| JP | 2003-309693 A | | 10/2003 |
| JP | 2004-48284 A | | 2/2004 |
| JP | 2004-157834 A | | 6/2004 |
| JP | 2004-158024 A | | 6/2004 |

* cited by examiner

*Primary Examiner* — Dov Popovici
*Assistant Examiner* — Mesfin Getaneh
(74) *Attorney, Agent, or Firm* — Sughrue Mion, PLLC

(57) ABSTRACT

A method and apparatus for printing an image using minimum memory and various templates are provided. The method includes: if a template list is received from the contents providing server, the image storing device selecting a template based on the received template list; if information on the selected template is downloaded from the contents providing server, the image storing device transmitting the downloaded template information to the printing device; and the image storing device transmitting information of an original image to be combined with the template to the printing device.

7 Claims, 14 Drawing Sheets

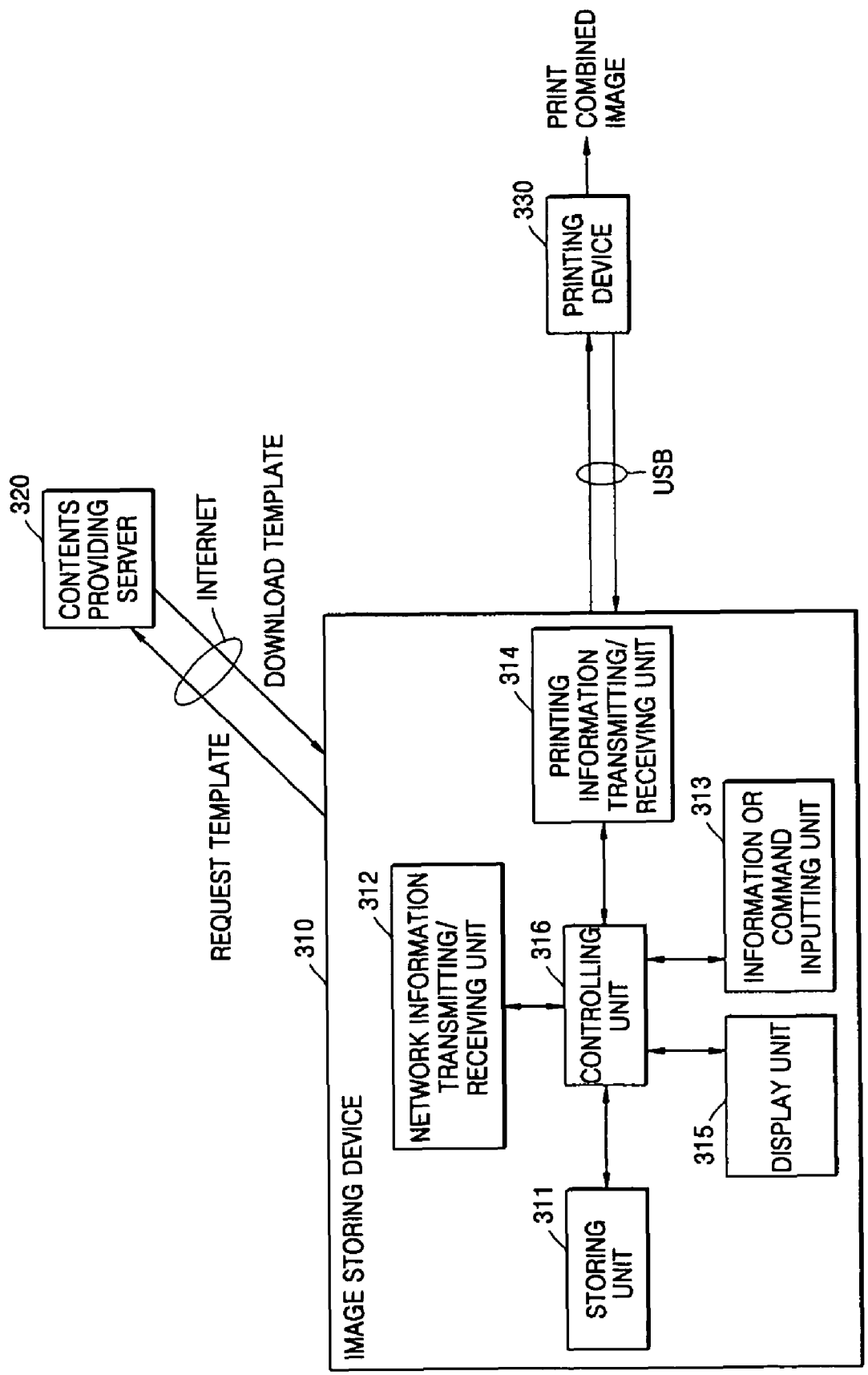

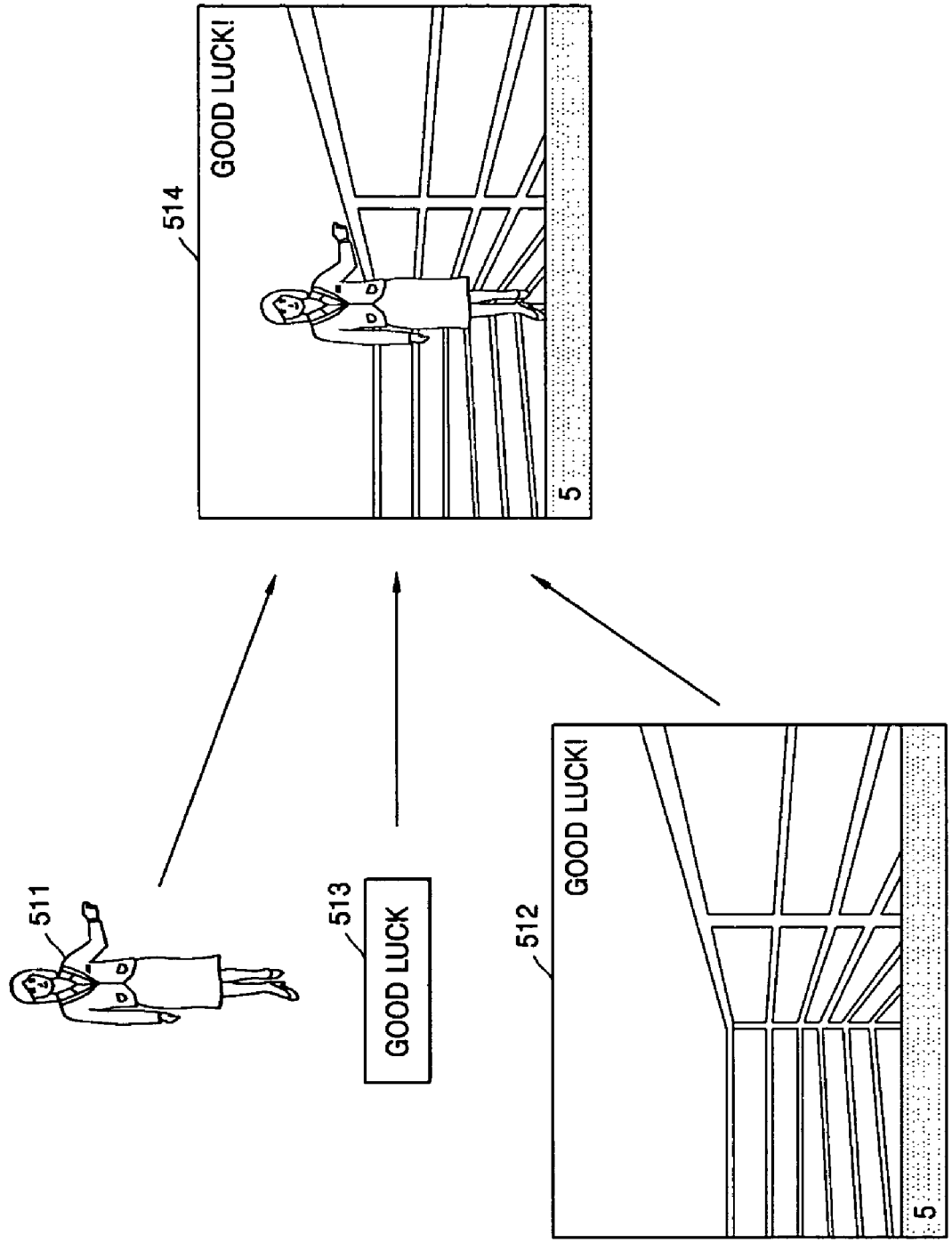

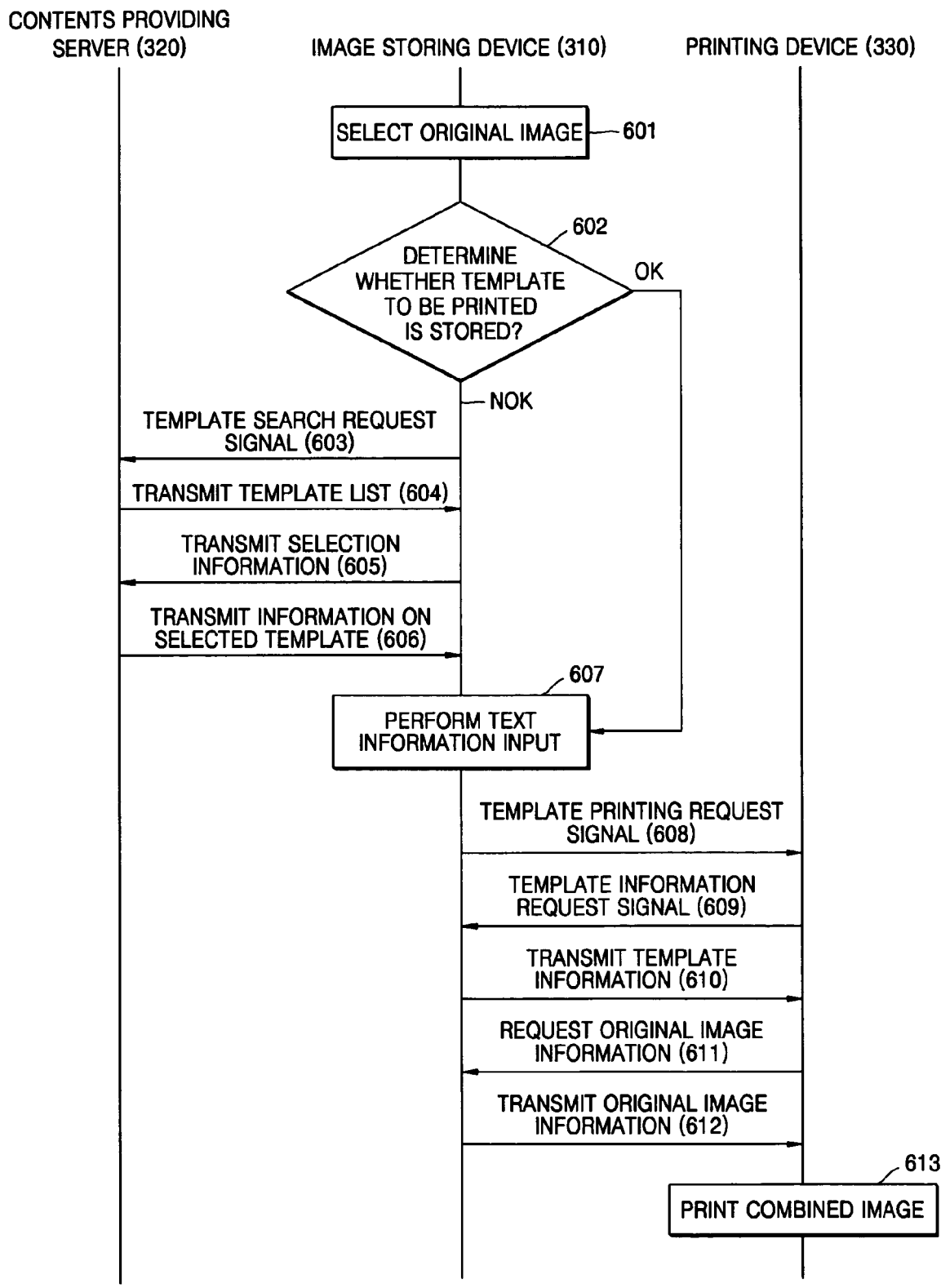

METHOD AND SYSTEM FOR PRINTING IMAGE USING TEMPLATE AND RECORDING MEDIUM STORING THE METHOD

This application claims priority from U.S. Patent Provisional Application No. 60/633,421 filed on Dec. 7, 2004 in the U.S. Patent and Trademark Office, and Korean Patent Application No. 10-2005-0011013 filed on Feb. 5, 2005 in the Korean Intellectual Property Office, the disclosures of which are incorporated herein in their entirety by reference.

BACKGROUND OF THE INVENTION

1. Field of the Invention

Methods and systems consistent with the present invention relate to image printing, and more particularly, to printing an image using a template.

2. Description of the Related Art

Conventionally, an image printing method using a template generates an image file combined with the template and an original image in an image storing device or website, stores the combined image file in the image storing device, and transfers the stored image file to a printing device.

FIG. 1 is a flowchart illustrating a conventional method of combining a template and an original image in an image storing device 100 and printing the combined image. Referring to FIG. 1, the image storing device 100 selects the original image to be printed (Operation 121) and selects a desired template among templates stored therein (Operation 122). The image storing device 100 combines the selected original image with the selected template and stores the combined image file (Operation 123). The image storing device 100 requests image file printing for a printing device 110 connected thereto (Operation 124). If the image storing device 100 receives a printing information request from the printing device 110, it reads the stored image file and transfers the read image file to the printing device 110 (Operation 126). The printing device 110 prints the combined image file (Operation 127).

However, the image printing method of FIG. 1 requires an image storing device which is capable of storing an original image, a template, and a combined image file. Therefore, the image printing method cannot be used for a device having small memory capacity such as a mobile device or a portable device. To use a template that is not stored in an image storing device, a user upgrades firmware of the image storing device or converts a format of the template into a file format to be recognized by the image storing device and stores the converted template in the image storing device to update a template stored in the image storing device. As such, updating a template is very complex.

FIG. 2 is a status diagram illustrating a conventional process of generating a combined image file of a template and an original image and printing the combined image file at a website. Referring to FIG. 2, an image storing device 201 connects to a website 202, uploads the original image to the website 202, and combines the template with the original image at the website 202. The image storing device 201 downloads the combined image from the website 202 and transfers the downloaded image to a printing device 203.

Alternatively, the image storing device 201 uploads the original image to a personal computer (PC) 204. The PC 204 connects the website 202 and uploads the original image to website 202. When the uploaded original image and a template are combined at the website 202, the image storing device 201 or the PC 204 downloads the combined image file, and transfers the downloaded image file to the printing device 203.

However, since the image printing method of FIG. 2 must upload an original image to the website, the original image may be leaked out. Also, a PC is required in order to easily combine an image and a template and edit the combined image at the website. Since the downloaded combined image file cannot be edited, the used template cannot be reused for another original image. To print a combined image of the used template and another original image, another original image is uploaded to website and the combined image file is downloaded. Since the downloaded combined image file is stored and transferred to the printing device, memory capacity required to store the combined image file must be obtained.

SUMMARY OF THE INVENTION

The present invention provides a method and apparatus for printing an image using minimum memory and various templates, and recording medium storing the method.

The present invention also provides a method and apparatus for printing an image using a network-based template without leaking out an original image, and recording medium storing the method.

According to an aspect of the present invention, there is provided a method of printing an image using a template in a system that includes at least one contents providing server, an image storing device connected to the contents providing server through a network, and a printing device connected to the image storing device, the method comprising: if a template list is received from the contents providing server, the image storing device selecting a template based on the received template list; if information on the selected template is downloaded from the contents providing server, the image storing device transmitting the downloaded template information to the printing device; and the image storing device transmitting information of an original image to be combined with the template to the printing device.

According to another aspect of the present invention, there is provided a method of printing an image using a template in a system that includes an image storing device and a printing device connected to the image storing device, the method comprising: if template printing is requested from the image storing device, the printing device requesting template information for the image storing device; if the template information is received, the printing device requesting information of an original image to be combined with the template to the image storing device; and if the original image information is received, the printing device printing a combined image of a template based on the template information and an original image based on the original image information.

According to still another aspect of the present invention, there is provided a method of printing an image using a template in a system that includes at least one contents providing server, a printing device connected to the contents providing server through a network, and an image storing device, the method comprising: if a template search is requested from the image storing device, the printing device receiving a template list from the contents providing server and transmitting the received template list to the image storing device; if template information selected by the image storing device is requested, the printing device receiving the selected template information from the contents providing server and transmitting the received template information to the image storing device; and if template information and original image information are received from the image storing device, the printing device printing a combined image of a template based on the template information and an original image based on the original image information.

According to yet another aspect of the present invention, there is provided a method of printing an image using a template in a system that includes an image storing device and a printing device connected to the image storing device, the method comprising: the image storing device requesting a template request for the printing device; if a template list is received from the printing device, the image storing device selecting a template to be printed and transmitting selection information of the selected template to the printing device; and if information on the selected template is received from the printing device, the image storing device transmitting the template information and information of an original image to be printed to the printing device.

According to a further aspect of the present invention, there is provided an image printing system using a template comprising: a contents providing server providing at least one piece of template information; an image storing device connected to the contents providing server through a network, receiving a template list and information on a selected template from the contents providing server, and storing information of an original image; and a printing device, if the template information and the original image information are received from the image storing device, printing a combined image of the template and the original image based on the received template information and the original image information.

According to a further aspect of the present invention, there is provided a image printing system using a template comprising: a contents providing server providing at least one piece of template information; an image storing device receiving a template list and information on a selected template and storing information of an original image; and a printing device connected to the contents providing server through a network, if the image storing device requests for a template search, receiving the template list from the contents providing server and transmitting the received template list to the image storing device, if the image storing device requests for information on the selected template, receiving the selected template information from the contents providing server and transmitting the received template information to the image storing device, if template information and information on an original image are received from the image storing device, printing a combined image of the template and the original image based on the received template information and the original image information.

According to a further aspect of the present invention, there is provided a computer readable recording medium having embodied thereon a computer program for a method of printing an image using a template in a system that includes at least one contents providing server, an image storing device connected to the contents providing server through a network, and a printing device connected to the image storing device, wherein the method comprises: if a template list is received from the contents providing server, the image storing device selecting a template based on the received template list; if information on the selected template is downloaded from the contents providing server, the image storing device transmitting the downloaded template information to the printing device; and the image storing device transmitting information of an original image to be combined with the template to the printing device.

BRIEF DESCRIPTION OF THE DRAWINGS

The above and/or other aspects of the present invention will become more apparent by describing in detail exemplary embodiments thereof with reference to the attached drawings in which:

FIG. 3 is a block diagram illustrating an image printing system using a template according to an exemplary embodiment of the present invention;

FIGS. 5A and 5B are prints of a combined image according to an exemplary embodiment of the present invention;

FIG. 6 is a flowchart illustrating an image printing method using a template according to an exemplary embodiment of the present invention;

DETAILED DESCRIPTION OF EXEMPLARY EMBODIMENTS OF THE INVENTION

Figure 1:
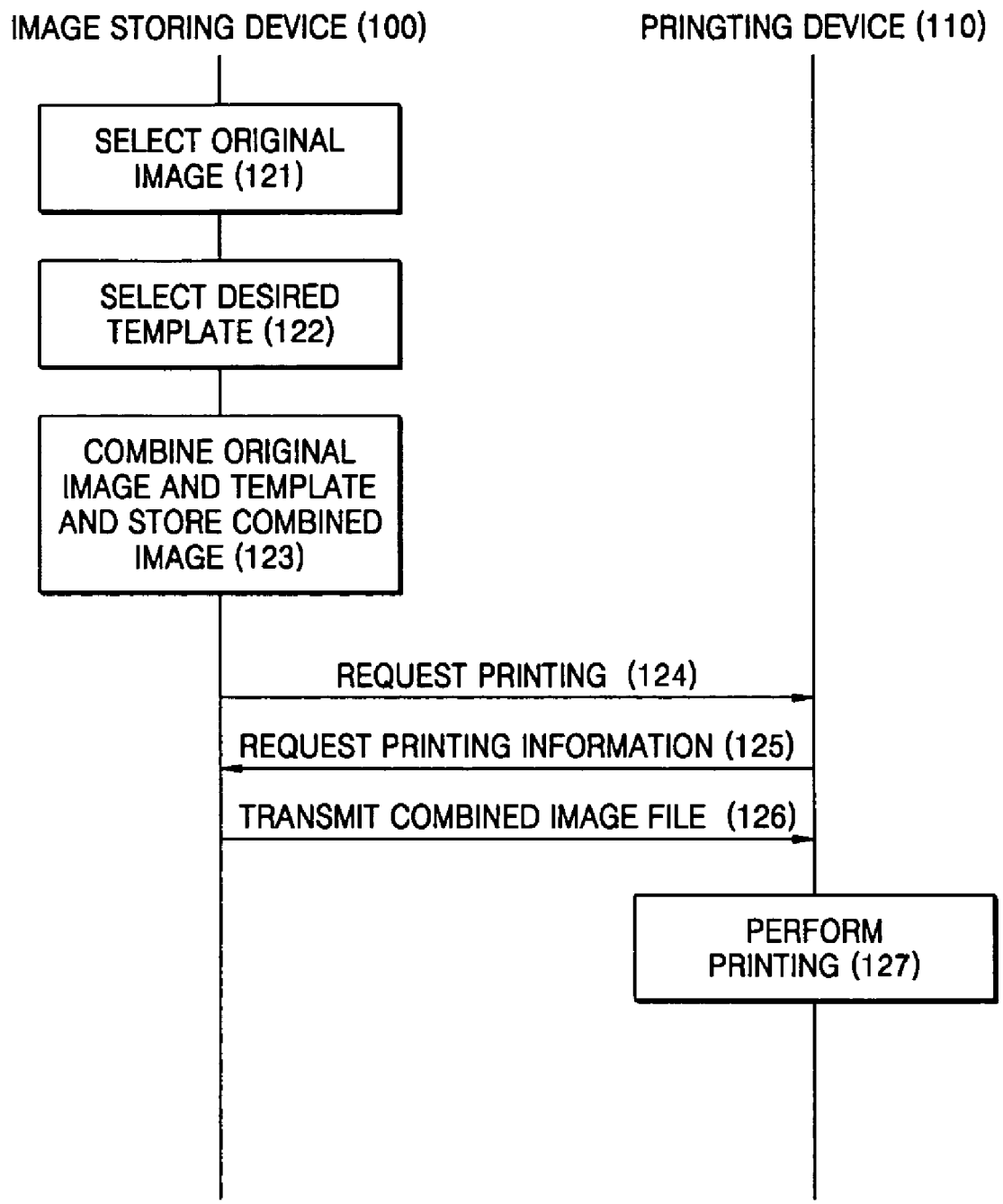
FIG. 1 is a flowchart illustrating a conventional image printing method using a template.
Figure 2:
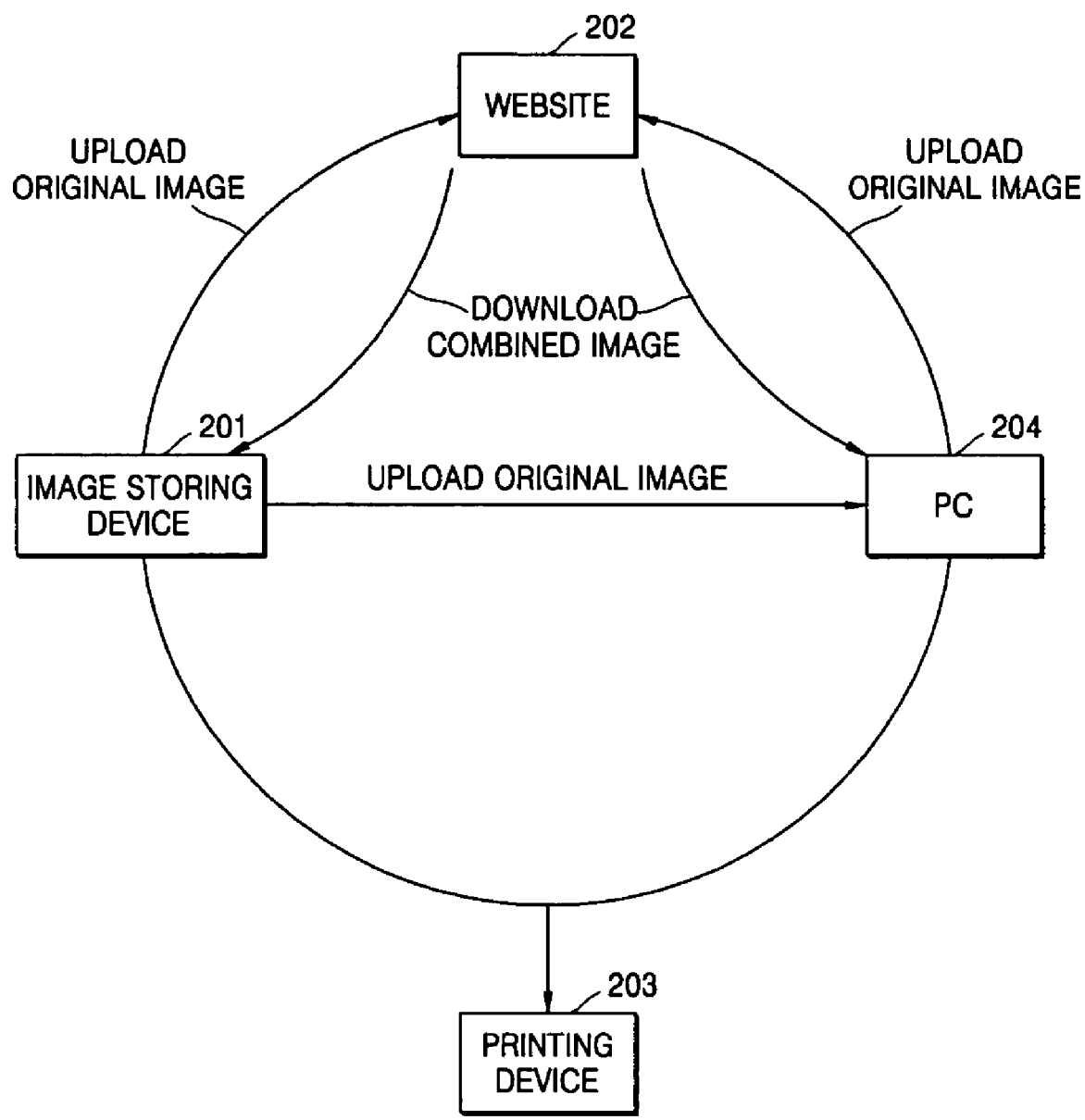
FIG. 2 is a status diagram illustrating a conventional image printing process using a template.

The present invention will now be described more fully with reference to the accompanying drawings.

FIG. 3 is a block diagram illustrating an image printing system using a template according to an exemplary embodiment of the present invention. Referring to FIG. 3, the image printing system comprises an image storing device 310, a contents providing server 320, and a printing device 330.

The image storing device 310 receives template information from the contents providing server 320 connected through a network such as the Internet, selects and stores an original image to be combined with a template, and inputs user information or command and text information.

To this end, the image storing device 310 includes a storing unit 311, a network information transmitting/receiving unit 312, an information or command inputting unit 313, a printing information transmitting/receiving unit 314, a display unit 315, and a controlling unit 316. The image storing device 310 may further include a camera used to obtain an original image and a mobile or portable device having restricted memory.

The storing unit 311 stores at least one piece of original image information. Original image information contains content of an original image (or the original image), information of the original image, such as a name and size of the original image, required to print an image combined with a template. Original image information is in the form of a file. The storing unit 311 stores at least one piece of template information received from the contents providing server 320 according to a user's selection. Template information contains content of a template (or the template), information of the template such as a name and size of the original image, required to print the template combined with the original image. The template information is in the form of a file.

The network information transmitting/receiving unit 312 transmits/receives information between the image storing device 310 and the contents providing server 320 through the Internet. After the image storing device 310 is connected to the contents providing server 320, the network information transmitting/receiving unit 312 transmits a template request signal and a selected template information request signal from the image storing device 310 to the contents providing server 320, and transmits a template list and information on a selected template from the contents providing server 320 to the image storing device 310.

The information or command inputting unit 313 can input a command to select an original image to be printed among original images stored in the storing unit 311, a command to select a template to be printed among templates stored in the storing unit 311, text information, a template request sending command, a selected template information request sending command, a received template information storing command, and a printing request sending command.

Text information can contain content of text (or the text), a font, a color, a size of the text, and combination location information necessary for printing an image combined with the text and an image combined with the original image and the template, and template printing.

The printing information transmitting/receiving unit 314 transmits/receives printing information between the image storing device 310 and the printing device 330 using an interface device such as a Universal Serial Bus (USB).

The display unit 315 displays the original image, the template, the text, or a screen that overlays them.

Figure 4A:
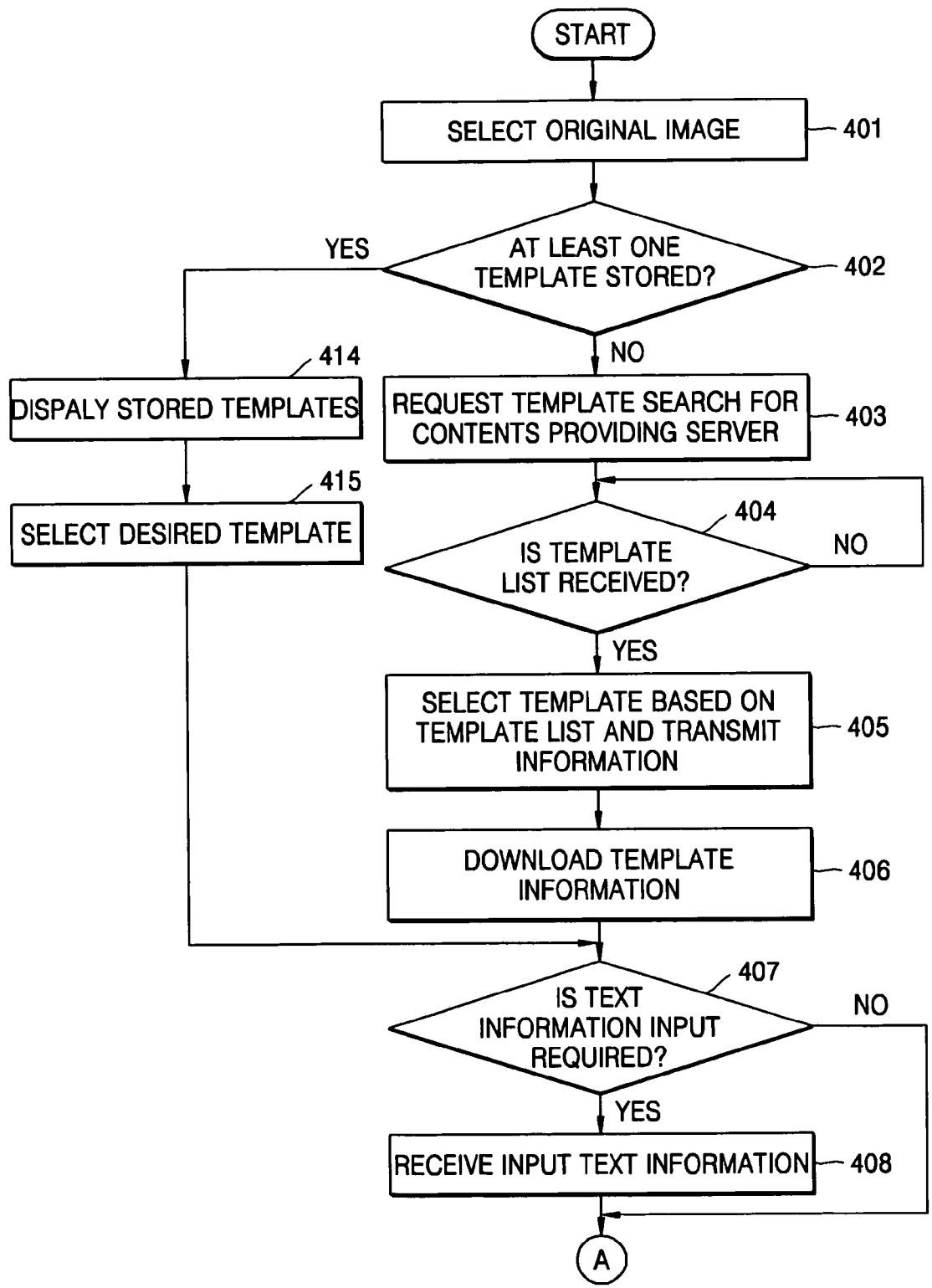
FIGS. 4A and 4B are flowcharts illustrating an image storing device shown in FIG. 3.
Figure 4B:
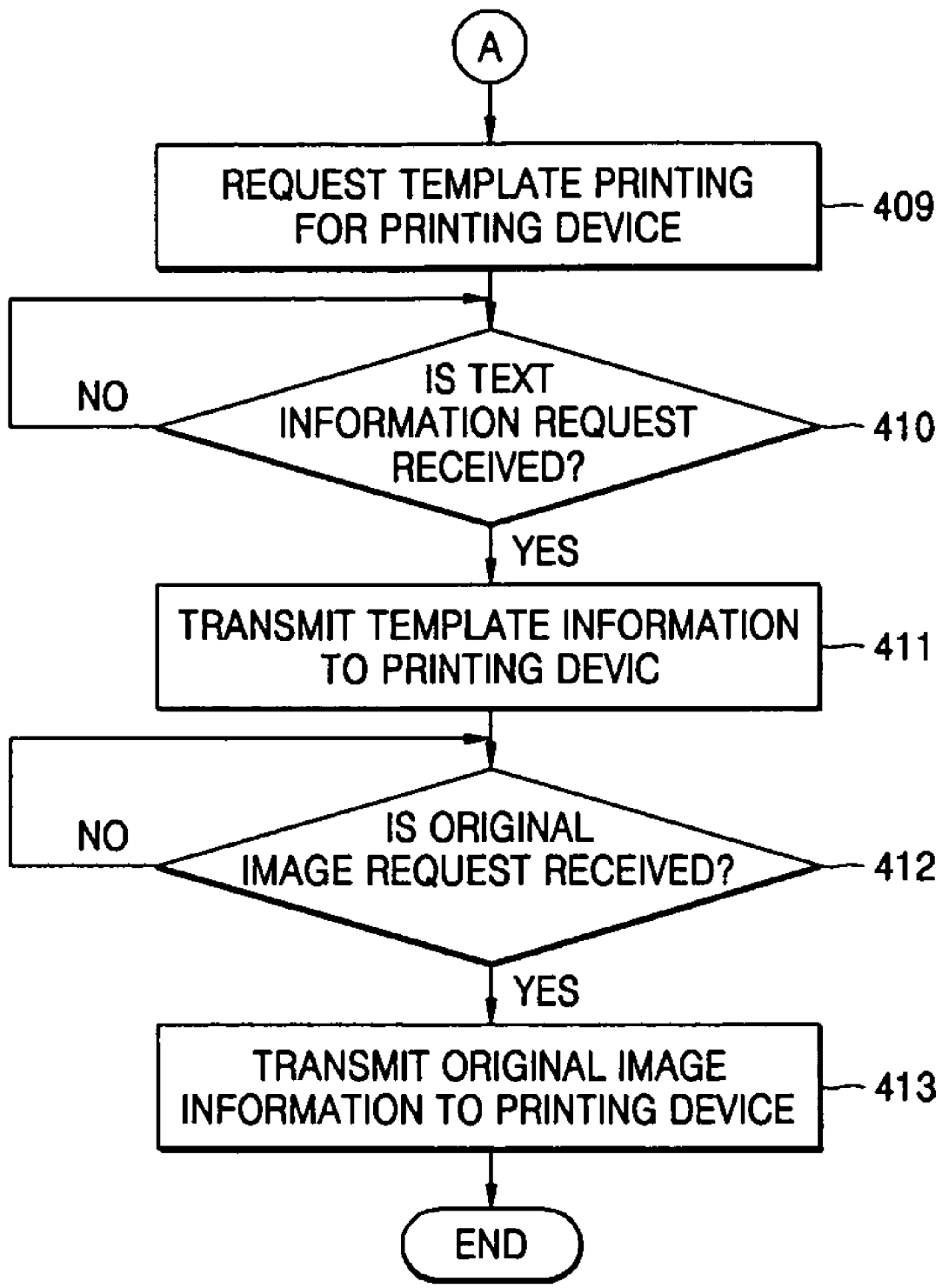

The controlling unit 316 receives information from the information or command inputting unit 313 and controls the storing unit 311, the network information transmitting/receiving unit 312, the printing information transmitting/receiving unit 314, and the display unit 315 based on flowcharts shown in FIGS. 4A and 4B.

FIGS. 4A and 4B are flowcharts illustrating the image storing device shown in FIG. 3. Referring to FIGS. 4A and 4B, the controlling unit 316 selects an original image to be printed among original images stored in the storing unit 311 (Operation 401). The controlling unit 316 can display all original images stored in the storing unit 311 on the display unit 315.

The controlling unit 316 determines whether the storing unit 311 stores a template to be printed (Operation 402).

If it is determined that the storing unit 311 stores at least one template, the controlling unit 316 displays stored templates on the display unit 315 to allow a user to select a template to be printed (Operation 414). If the user selects one of templates displayed on the display unit 315, the controlling unit 316 determines that the image storing device 310 stores the template selected by the user and selects the template selected by the user as a template for combination printing (Operation 415), and then proceeds to Operation 407.

However, if it is determined that the storing unit 311 does not store at least one template or the user does not want stored templates, the controlling unit 316 requests a template search for the contents providing server 320 (Operation 403). The network information transmitting/receiving unit 312 sends a template search request to the contents providing server 320.

When the controlling unit 316 receives a template list from the contents providing server 320 via the network information transmitting/receiving unit 312 (Operation 404), the controlling unit 316 outputs the received template list to the display unit 315. When a user selects a template to be printed based on the template list, the controlling unit 316 sends information on the selected template to the contents providing server 320 via the network information transmitting/receiving unit 312 (Operation 405).

The controlling unit 316 downloads information on the selected template from the contents providing server 320 (Operation 406). According to a user's request, the controlling unit 316 stores the downloaded information on the selected template in the storing unit 311 in a file format and uses it to combine the selected template with another original image.

In Operation 407, the controlling unit 316 determines whether the user wants to input text information. If it is determined that the user wants to input text information, the controlling unit 316 receives text information from the information or command inputting unit 313 (Operation 408).

However, if it is determined that the user does not want to input text information or the controlling unit 316 receives text information by the operation 408, the controlling unit 316 sends a template printing request signal to the printing device 330 through the printing information transmitting/receiving unit 314 (Operation 409).

If the controlling unit 316 receives a template information request signal from the printing device 330 (Operation 410), it transmits template information to be printed to the printing device 330 (Operation 411). Template information contains basic template information including a name and a size of the template for combination printing, text information, and basic printing information including the number of sheets.

If the controlling unit 316 receives an original image request signal from the printing device 330 (Operation 412), it transmits original image information to the printing device 330 (Operation 413). Original image information contains the original image and basic information on the original image for combination printing.

The contents providing server 320 stores and manages template information and a list of the template information. If the image storing device 310 requests for a template search, the contents providing server 320 provides the template list to the image storing device 310. If the image storing device 310 requests for information on the selected template, the contents providing server 320 provides the information on the selected template to the image storing device 310. To this end, the contents providing server 320 databases and manages the template information.

Figure 5A:
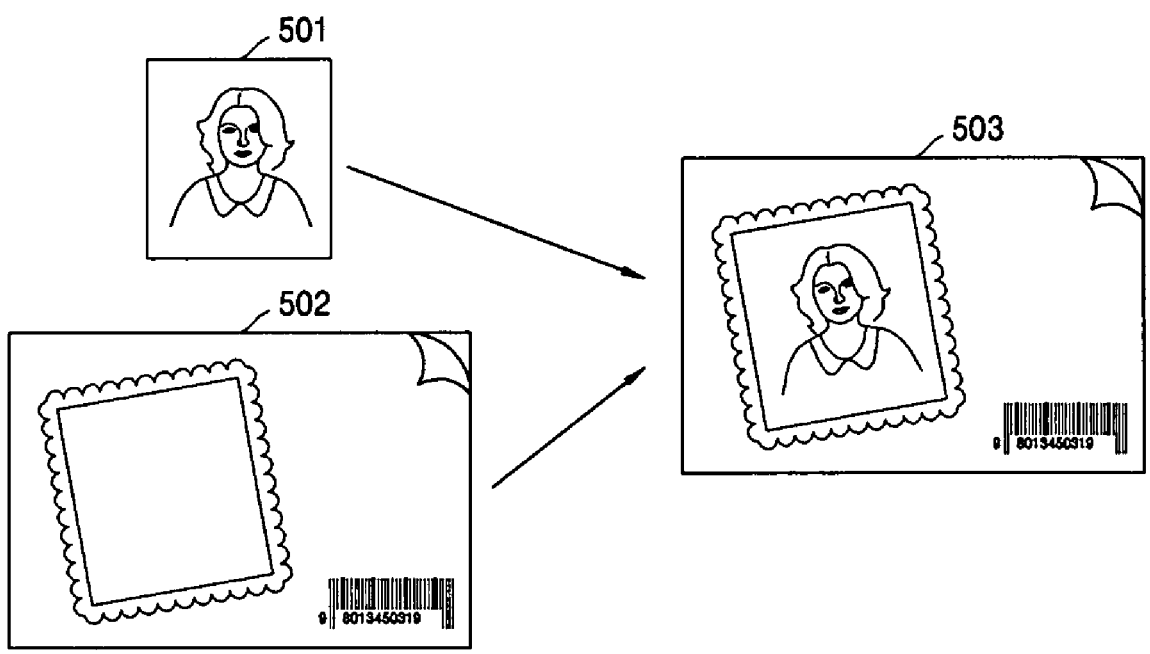

If the printing device 330 receives template information and original image information from the image storing device 310, it prints a combined image based on the received template information and the original image information as shown in FIGS. 5A and 5B that are prints of the combined image according to an exemplary embodiment of the present invention. FIG. 5A is a print of a combined image 503 of a template 502 and an original image 501. FIG. 5B is a print of a combined image 514 of an original image 511, a template 512, and text ("Good Lock!") 513.

FIG. 6 is a flowchart illustrating an image printing method using a template according to an exemplary embodiment of the present invention. Referring to FIGS. 3 and 6, the image storing device 310 selects an original image (Operation 601) and determines whether a template to be printed is stored therein (Operation 602). If it is determined that the template to be printed is not stored in the image storing device 310 (NOK), the image storing device 310 sends a template search request signal to the contents providing server 320 (Operation 603).

If the image storing device 310 receives a template list from the contents providing server 320 (Operation 604), it selects a template in the provided template list and transmits information on the selected template to the contents providing server 320 (Operation 605). If the image storing device 310 receives information on the selected template from the contents providing server 320, it inputs text information according to a user's request (Operation 607). The text information input depends on the user's request. Available text information is the same as described in the information or command inputting unit 313 shown in FIG. 3.

If it is determined that the template to be printed is stored in the image storing device 310 (OK), the image storing device 310 proceeds to Operation 607.

The image storing device 310 transmits a template printing request signal to the printing device 330 (Operation 608). If the image storing device 310 receives a template information request signal from the printing device 330 (Operation 609), it transmits template information to the printing device 330 (Operation 610). Template information contains basic printing information such as the number of sheets and text information.

If the printing device 330 requests for original image information (Operation 611), the image storing device 310 transmits original image information to the printing device 330 (Operation 612). The printing device 330 prints a combined image of the template and the original image based on the template information and the original image information (Operation 613). The printing device 330 controls a printing location, a size, a font of the combined image and/or the combined text based on the received template information and original image information.

Figure 7:
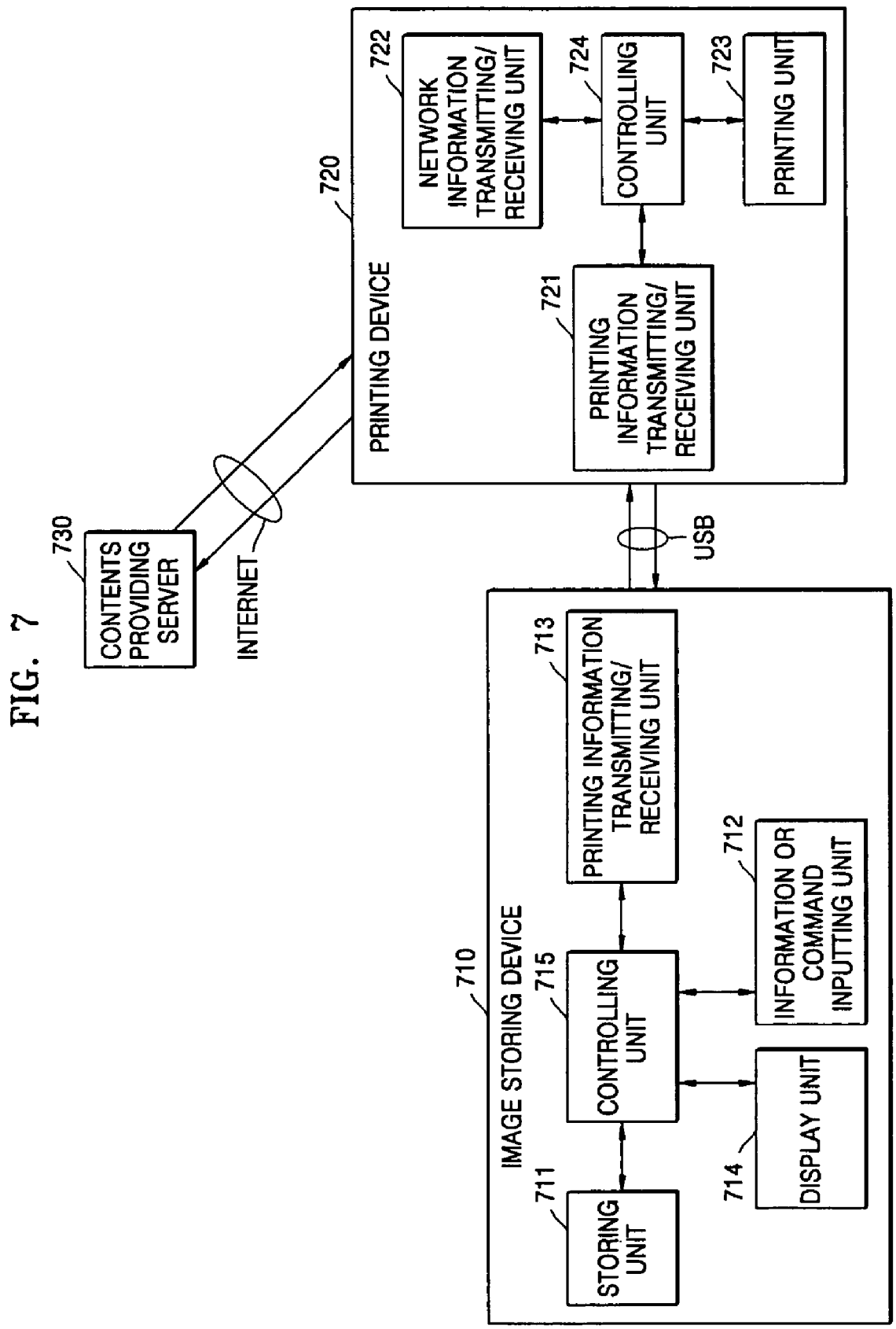
FIG. 7 is a block diagram illustrating an image printing system using a template according to another exemplary embodiment of the present invention.

FIG. 7 is a block diagram illustrating an image printing system using a template according to another exemplary embodiment of the present invention. Referring to FIG. 7, the image printing system comprises an image storing device 710, a printing device 720, and a contents providing server 730.

Unlike in FIG. 3, the printing device 720 downloads a template from the contents providing server 730 connected through a network such as the Internet. The image storing device 710 includes a storing unit 711, an information or command inputting unit 712, a printing information transmitting/receiving unit 713, a display unit 714, and a controlling unit 715.

The storing unit 711, the information or command inputting unit 712, the printing information transmitting/receiving unit 713, and the display unit 714 operate in the same manner of the storing unit 311, the information or command inputting unit 313, the printing information transmitting/receiving unit 314, and the display unit 315 shown in FIG. 3.

Figure 8A:
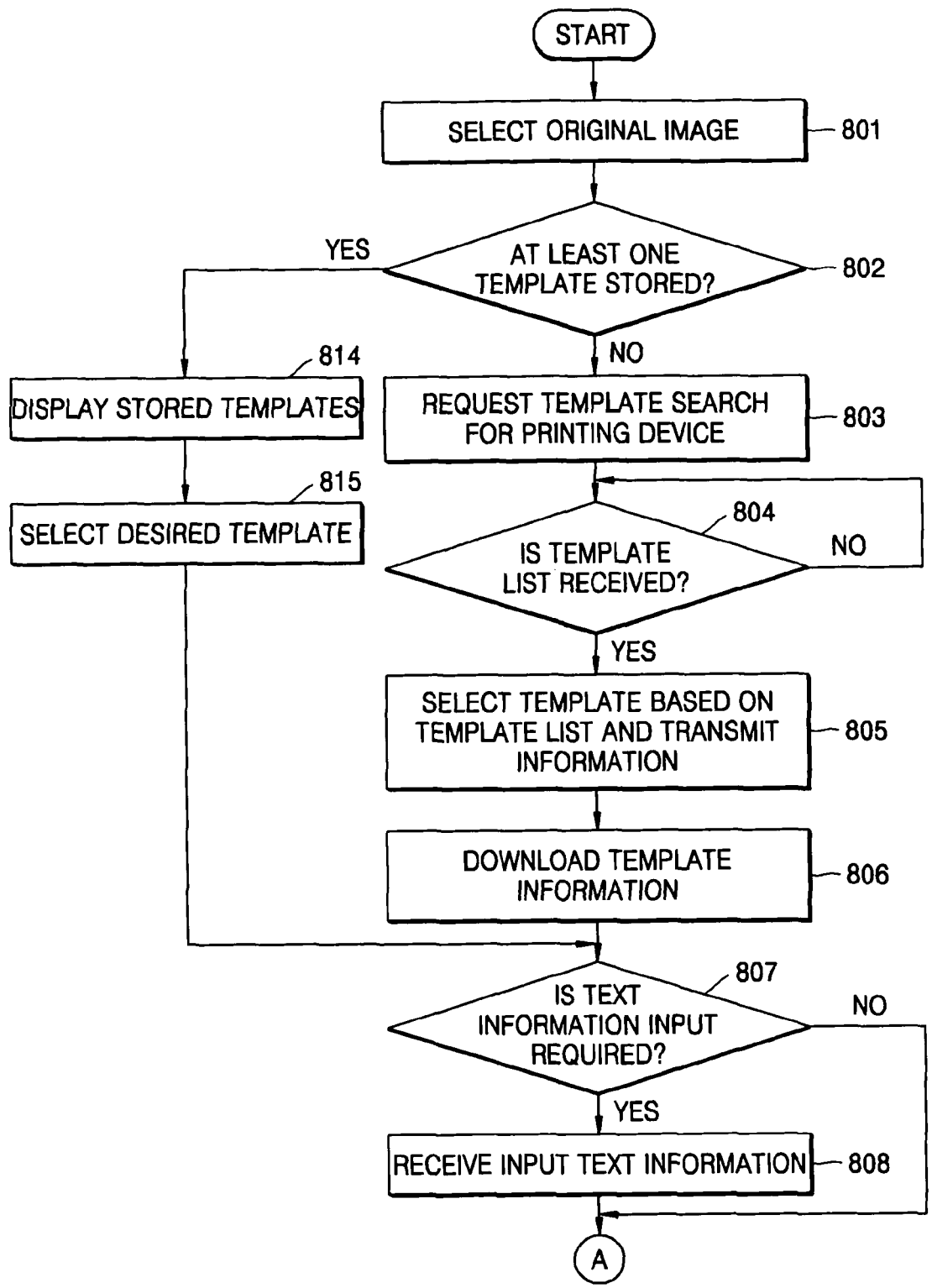
FIGS. 8A and 8B are flowcharts illustrating an image storing device shown in FIG. 7.
Figure 8B:
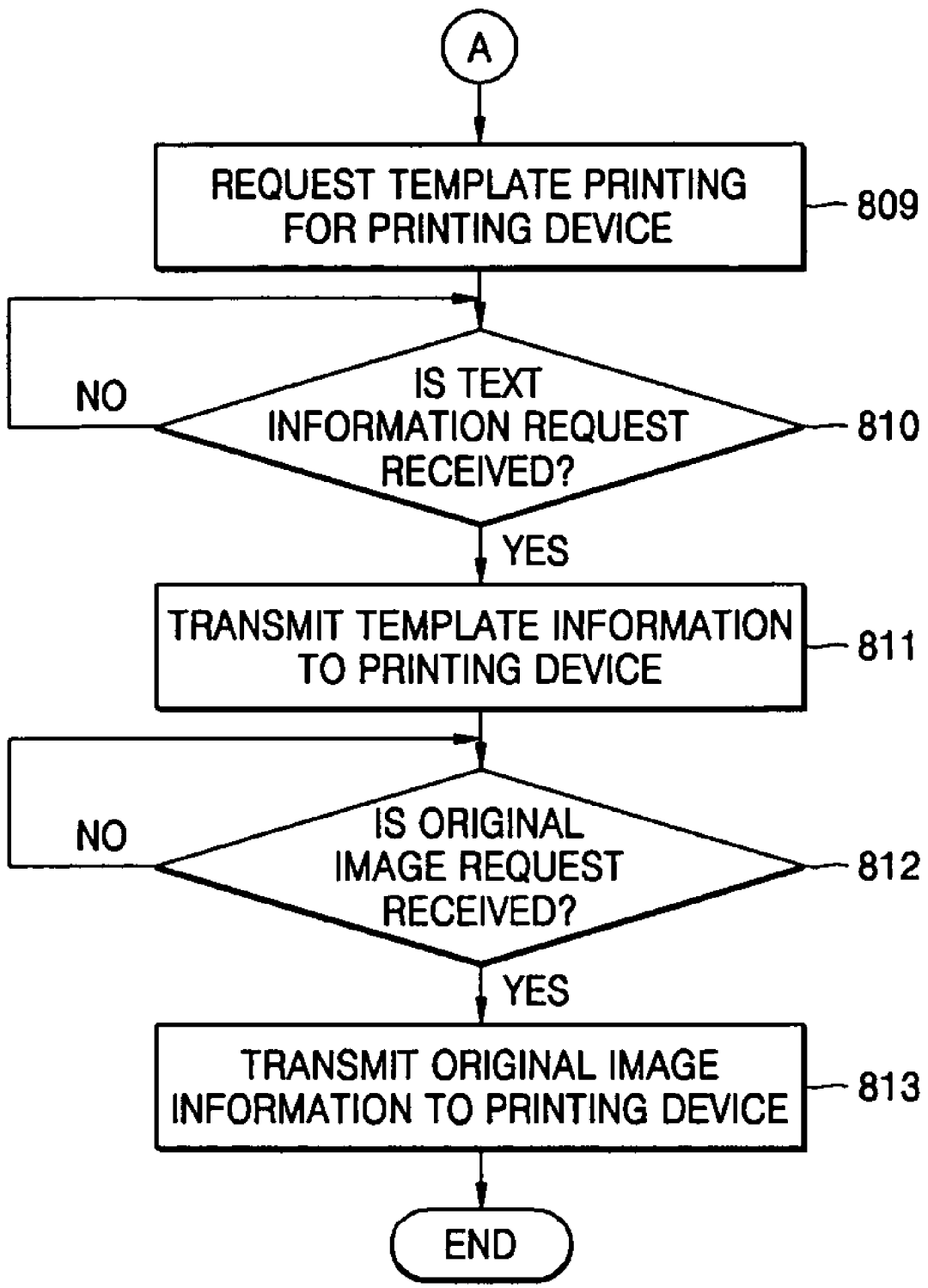

The controlling unit 715 receives template information provided by the contents providing server 730 through the printing device 720 based on flowcharts shown in FIGS. 8A and 8B.

FIGS. 8A and 8B are flowcharts illustrating the image storing device shown in FIG. 7. Referring to FIGS. 8A and 8B, the controlling unit 715 selects an original image to be printed among original images stored in the storing unit 711 (Operation 801). To this end, the controlling unit 715 displays all original images stored in the storing unit 711 on the display unit 715.

The controlling unit 715 determines whether the storing unit 711 stores a template to be printed (Operation 802).

If it is determined that the storing unit 711 includes at least one template, the controlling unit 715 displays the stored templates on the display unit 715 to allow a user to select a template to be printed (Operation 814). If the user selects one of templates displayed on the display unit 714, the controlling unit 715 determines that the image storing device 710 stores the template selected by the user and selects the template selected by the user as a template for combination printing (Operation 815), and then proceeds to Operation 807.

However, if it is determined that the storing unit 711 does not store at least one template or the user does not want stored templates, the controlling unit 715 requests a template search for the printing device 720 through the printing information transmitting/receiving unit 713 (Operation 803). If the controlling unit 715 receives a template list from the printing device 720 (Operation 804), it outputs the received template list to the display unit 714. If the template to be printed is selected based on the template list displayed on the display unit 714, the controlling unit 715 transfers information on the selected template to the printing device 720 through the printing information transmitting/receiving unit 713 (Operation 805).

The controlling unit 715 downloads information on the selected template from the printing device 720 (Operation 806). According to a user's request, the controlling unit 715 stores the downloaded information on the selected template in the storing unit 711 in a file format and uses it to be combined with another original image.

In Operation 807, the controlling unit 715 determines whether the user wants to input text information (Operation 807). If it is determined that the user wants to input text information, the controlling unit 715 receives text information through the information or command inputting unit 712 (Operation 808).

However, if it is determined that the user does not want to input text information or the controlling unit 715 receives text information in Operation 808, the controlling unit 715 sends a template printing request signal to the printing device 720 through the printing information transmitting/receiving unit 713 (Operation 809).

If the controlling unit 715 receives a template information request signal from the printing device 720 (Operation 810), it transmits template information to be printed to the printing device 720 (Operation 811). Template information contains template basic information including a name and a size of the template for combination printing, text information, and basic printing information including the number of sheets.

If the controlling unit 715 receives an original image request signal from the printing device 720 (Operation 812), it transmits original image information to the printing device 720 (Operation 813). Original image information contains the original image and basic information on the original image for combination printing.

The printing device 720 is connected to the contents providing server 730 through a network such as the Internet, provides the template information to the image storing device 710, and prints an combined image based on the template information and the original image information transmitted from the image storing device 710.

To this end, the printing device 720 includes a printing information transmitting/receiving unit 721, a network information transmitting/receiving unit 722, a printing unit 723, and a controlling unit 724.

The printing information transmitting/receiving unit 721 transmits/receives printing information between the image storing device 710 and the printing device 720 through an interface like a USB in the same manner of the printing information transmitting/receiving unit 314 shown in FIG. 3.

The network information transmitting/receiving unit 722 transmits/receives template information between the contents providing server 730 and the printing device 720 in the same manner of the network information transmitting/receiving unit 312 shown in FIG. 3.

The printing unit 723 prints a combined image of a template and an original image or a combined image of a template, an original image, and text received from the printing information transmitting/receiving unit 721 under control of the controlling unit 724.

Figure 9A:
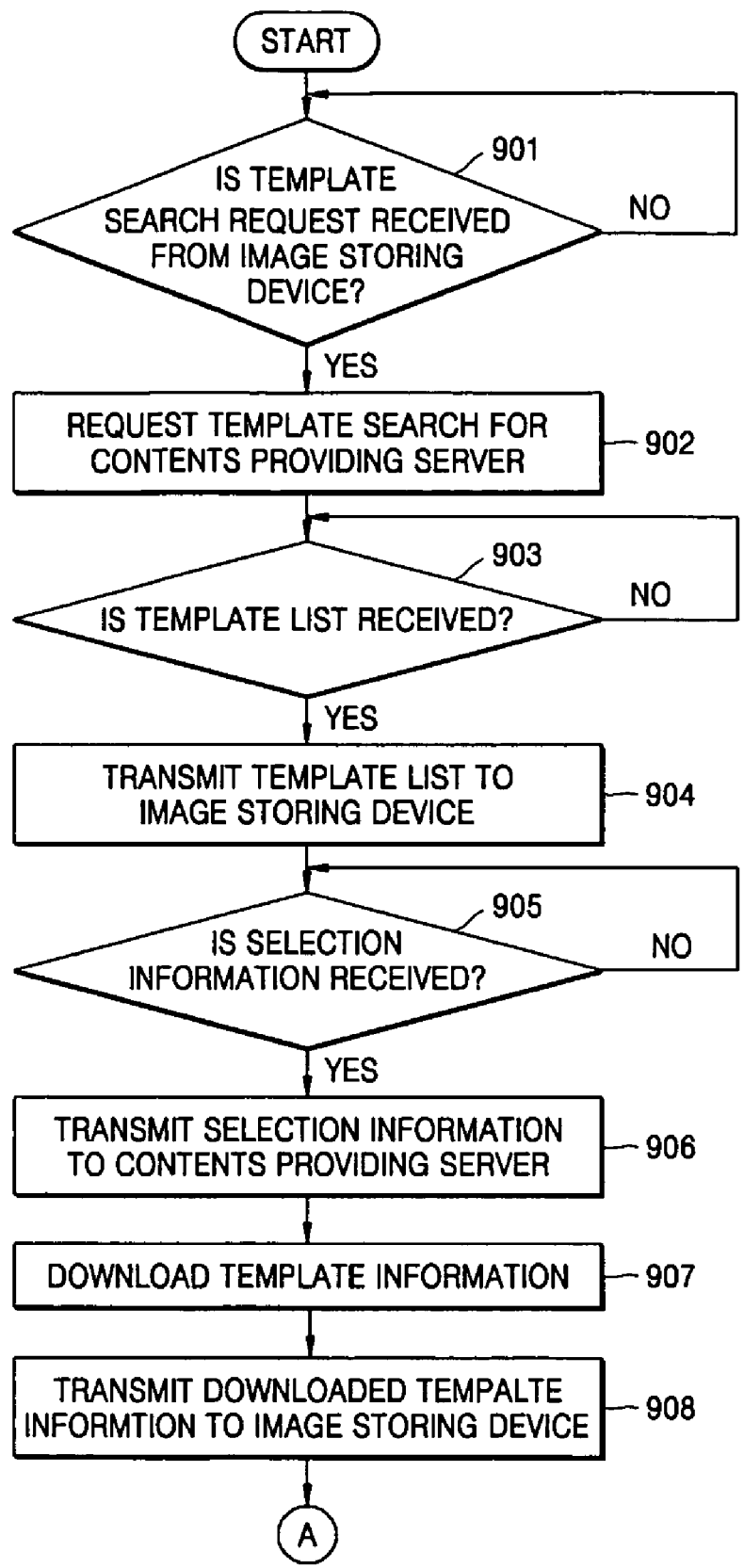
FIGS. 9A and 9B are flowcharts illustrating a printing device shown in FIG. 7.
Figure 9B:
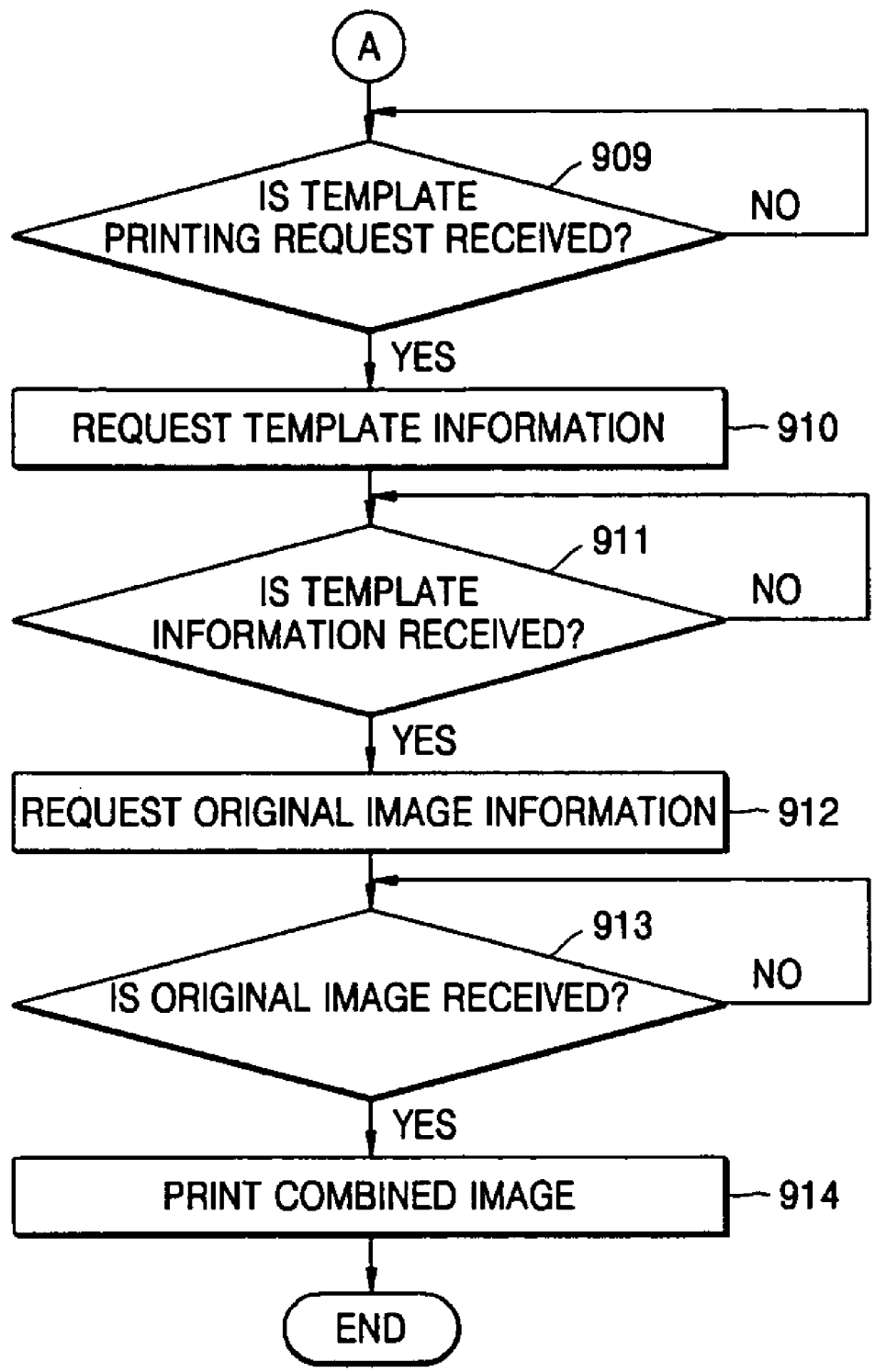

The controlling unit 724 provides the template information provided by the contents providing server 730 to the image storing device 710 based on flowcharts shown in FIGS. 9A and 9B and prints a combined image.

FIGS. 9A and 9B are flowcharts illustrating the printing device shown in FIG. 7. Referring to FIGS. 9A and 9B, if the controlling unit 724 receives a template search request signal from the image storing device 710 through the printing information transmitting/receiving unit 721 (Operation 901), it sends the template search request signal to the contents providing server 730 through the network information transmitting/receiving unit 722 (Operation 902).

If the controlling unit 724 receives a template list from the contents providing server 730 (Operation 903), it transmits the received template list to the image storing device 710 (Operation 904).

If the controlling unit 724 receives information on a selected template from the image storing device 710 (Operation 905), it transmits the received information to the contents providing server 730 (Operation 906). If information on the selected template is downloaded from the contents providing server 730 through the network information transmitting/receiving unit 722 (Operation 907), the controlling unit 724 transmits the downloaded template information to the image storing device 710 (Operation 908).

If the controlling unit 724 receives a template printing request signal from the image storing device 710 from the printing information transmitting/receiving unit 721 (Operation 909), it sends a template information request signal to the image storing device 710 through the printing information transmitting/receiving unit 721 (Operation 910).

If the controlling unit 724 receives template information from the image storing device 710 (Operation 911), it requests an original image to the image storing device 710 (Operation 912). If it receives the original image (Operation 913), it controls the printing information transmitting/receiving unit 721 and the printing unit 723 to print a combined image (Operation 914). Printing the combined image is the same as that shown in FIG. 3.

Figure 10:
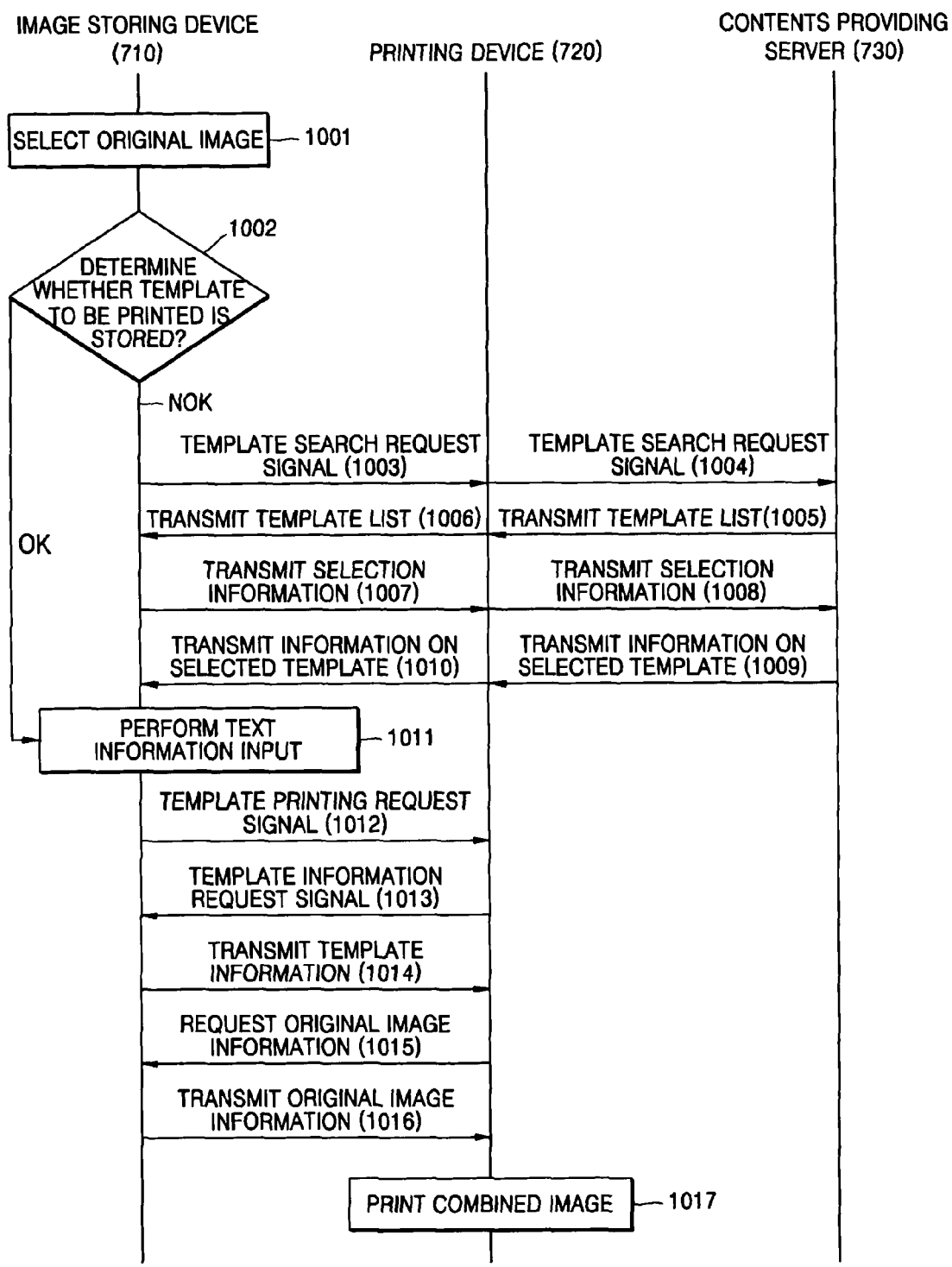
FIG. 10 is a flowchart illustrating an image printing method using a template according to another exemplary embodiment of the present invention.

FIG. 10 is a flowchart illustrating an image printing method using a template according to another exemplary embodiment of the present invention. Referring to FIGS. 7 and 10, the image storing device 710 selects an original image (Operation 1001) and determines whether a template to be printed is stored therein (Operation 1002). If it is determined that the template to be printed is stored in the image storing device 710 (NOK), the image storing device 710 sends a template search request signal to the printing device 720 (Operation 1003).

The printing device 720 sends the template search request signal to the contents providing server 730 connected through a network (Operation 1004). If a template list is provided from the contents providing server 730 (Operation 1005), the printing device 720 provides the template list to the image storing device 710 (Operation 1006).

If the image storing device 710 selects a template in the provided template list and transmits information on the selected template to the printing device 720 (Operation 1007), the printing device 720 transmits the received information to the contents providing server 730 (Operation 1008). If the selected template information is transmitted from the contents providing server 730 (Operation 1009), the printing device 720 transmits the received template information to the image storing device 710 (Operation 1010).

The image storing device 710 inputs text information according to a user's request (Operation 1011). The text information input depends on the user's request. Available text information is the same as described in the information or command inputting unit 313 shown in FIG. 3.

If it is determined that the template to be printed is stored in the image storing device 710 (OK) in Operation 1002, the image storing device 710 proceeds to Operation 1011.

The image storing device 710 transmits a template printing request signal to the printing device 720 (Operation 1012). If the image storing device 710 receives a template information request signal from the printing device 720 (Operation 1013), it transmits template information to the printing device 720 (Operation 1014). Template information contains basic printing information such as the number of sheets and text information.

If the printing device 720 requests for original image information (Operation 1015), the image storing device 710 transmits original image information to the printing device 720 (Operation 1016). The printing device 720 prints a combined image of the template and the original image based on the template information and the original image information (Operation 1017). The printing device 720 controls a printing location, a size, a font of a combined image and/or a combined text based on the received template information and original image information.

It is possible for the present invention to be realized on a computer-readable recording medium as a computer-readable code. Computer-readable recording mediums include every kind of recording device that stores computer system-readable data. ROMs, RAMs, CD-ROMs, magnetic tapes, floppy discs, optical data storage, etc. are used as a computer-readable recording medium. A computer-readable recording medium is dispersed in a network-connecting computer system, resulting in being stored and executed as a computer-readable code by a dispersion method.

According to the present invention, an original image and a template are provided to a printing device to print an image file combined with the original image and the template, thereby reducing memory capacity without storing the combined image file.

Also, a template provided from a contents providing server through a network is combined with an original image to print a combined image, thereby preventing the original image from leaking out and printing a combined image of the template and various original images without connecting to the contents providing server again.

It is possible to print a combined image of a template, an original image, and text inputted by a user.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of printing an image using a template in a system that includes at least one contents providing server, a printing device connected to the contents providing server through a network, and an image storing device, the method comprising:
   receiving a request for a template search from the image storing device at the printing device;

receiving a template list from the contents providing server at the printing device and transmitting the template list from the printing device to the image storing device;

receiving a request for template information of a template selected by the image storing device at the printing device, the template information comprising printing information for the selected template, the template being selected based on the template list transmitted from the printing device;

receiving the template information from the contents providing server at the printing device and transmitting the template information from the printing device to the image storing device; and receiving the template information and original image information from the image storing device at the printing device, the original image information including the original image;

generating a combined image of the template and the original image based on the template information and the original image information at the printing device; and printing the combined image at the printing device;

wherein the printing information for the selected template comprises a size of the template.

2. The method of claim 1, wherein, if text information is included in the template information received from the image storing device, the combined image includes the text information.

3. A method of printing an image using a template in a system that includes an image storing device and a printing device connected to the image storing device, the method comprising:

transmitting a template request from the image storing device to the printing device;

receiving a template list from a contents providing server by the printing device;

receiving the template list from the printing device at the image storing device;

selecting at the image storing device a template to be printed based on the received template list and transmitting information of the selected template from the image storing device to the printing device, the information of the selected template comprising printing information for the selected template; and receiving template information of the selected template from the printing device at the image storing device; and transmitting respectively the template information of the selected template and information of an original image to be printed from the image storing device to the printing device, the information of the original image including the original image;

wherein the printing information for the selected template comprises a size of the template.

4. The method of claim 3, wherein, if text information is input through the image storing device, the text information is included in the template information and transmitted to the printing device.

5. An image printing system using a template comprising:

a contents providing server which provides a template list and template information;

an image storing device which receives the template list and information of a template selected based on the received template list, and stores information of an original image, the information of the selected template comprising printing information for the selected template; and a printing device which is connected to the contents providing server through a network, receives a template search request signal from the image storing device, transmits the template search request signal to the contents providing server, receives the template list from the contents providing server and transmits the template list to the image storing device, receives template information of the template selected based on the template list from the contents providing server and transmits the template information of the selected template to the image storing device if the image storing device requests the template information, and generates and prints a combined image of the selected template and the original image based on the template information and the original image information which are received from the image storing device, the original image information including the original image;

wherein the printing information for the selected template comprises a size of the template.

6. A non-transitory computer readable recording medium having embodied thereon a computer program for a method of printing an image using a template in a system that includes at least one contents providing server, a printing device connected to the contents providing server through a network, and an image storing device, wherein the method comprises:

if a template search is requested from the image storing device to the printing device, receiving a template list from the contents providing server at the printing device and transmitting the template list from the printing device to the image storing device;

if template information of a template selected by the image storing device is requested by the image storing device to the printing device, receiving the template information of the selected template from the contents providing server at the printing device and transmitting the template information from the printing device to the image storing device, the template information comprising printing information for the template; and if the template information and original image information are received from the image storing device by the printing device, generating and printing a combined image of the template and an original image based on the template information and the original image information at the printing device, the original image information including the original image;

wherein the printing information for the template comprises a size of the template, wherein the template is selected based on the template list transmitted from the printing device to the image storing device.

7. A non-transitory computer readable recording medium having embodied thereon a computer program for a method of printing an image using a template in a system that includes an image storing device and a printing device connected to the image storing device, wherein the method comprises:

transmitting a request for a template from the image storing device to the printing device;

receiving a template list from a contents providing server by the printing device;

if the template list is received from the printing device by the image storing device, selecting at the image storing device a template to be printed based on the received template list and transmitting information of the selected template from the image storing device to the printing device, the information of the selected template comprising printing information for the selected template; and if information of the selected template is requested from the printing device to the image storing device, transmitting the information of the selected template and information of an original image to be printed from the image storing device to the printing device, the information of the original image including the original image;

wherein the printing information for the selected template comprises a size of the template.

* * * * *